United States Patent
Zhang et al.

(10) Patent No.: US 9,610,653 B2
(45) Date of Patent: Apr. 4, 2017

(54) METHOD AND APPARATUS FOR SEPARATION OF WORKPIECES AND ARTICLES PRODUCED THEREBY

(71) Applicant: ELECTRO SCIENTIFIC INDUSTRIES, INC., Portland, OR (US)

(72) Inventors: Haibin Zhang, Portland, OR (US); Fang Shan, San Jose, CA (US); Mathew Rekow, Santa Cruz, CA (US); Min Zhang, Fremont, CA (US); Glenn Simenson, Portland, OR (US); Qian Xu, Portland, OR (US); James Brookhyser, Portland, OR (US); Joe Frankel, Beaverton, OR (US); Michael Darwin, Portland, OR (US); Jack Rundel, Portland, OR (US); Matthew Pysher, Fremont, CA (US)

(73) Assignee: Electro Scientific Industries, Inc., Portland, OR (US)

( * ) Notice: Subject to any disclaimer, the term of this patent is extended or adjusted under 35 U.S.C. 154(b) by 215 days.

(21) Appl. No.: 14/032,829

(22) Filed: Sep. 20, 2013

(65) Prior Publication Data
US 2014/0083983 A1   Mar. 27, 2014

Related U.S. Application Data

(60) Provisional application No. 61/704,038, filed on Sep. 21, 2012, provisional application No. 61/735,489,
(Continued)

(51) Int. Cl.
*B23K 26/00* (2014.01)
*B23K 26/16* (2006.01)
(Continued)

(52) U.S. Cl.
CPC ........ *B23K 26/367* (2013.01); *B23K 26/0006* (2013.01); *B23K 26/0063* (2013.01); *B23K 26/364* (2015.10); *B23K 2203/50* (2015.10)

(58) Field of Classification Search
CPC ... B23K 26/36–26/388; B23K 2203/50; B23K 26/0006; B23K 26/00–26/0063; B23K 26/367
(Continued)

(56) References Cited

U.S. PATENT DOCUMENTS 2,959,507 A   11/1960  Long
3,453,097 A    7/1969  Hafner
(Continued)

FOREIGN PATENT DOCUMENTS

CN   102626835 A   8/2012
DE   10029110 A1   8/2001
(Continued)

OTHER PUBLICATIONS

International Search Report of PCT/US2013/061162, 3 pages.
(Continued)

*Primary Examiner* — Sang Y Paik

(57) ABSTRACT

The present invention is a method for separating a workpiece from a common substrate. It includes the steps of providing the workpiece, generating, within a beam source, a beam of laser pulses configured to modify a portion of the workpiece, determining a depth for creating a modified region based upon a characteristic of the workpiece and modifying a plurality of regions within the workpiece to form a plurality of modified regions. Modifying the plurality of regions includes directing the beam of laser pulses from an output of the beam source onto the workpiece, causing relative motion between the workpiece and the output of the beam source while directing the beam of laser pulses onto
(Continued)

workpiece, and modifying a characteristic of the pulses of the beam upon generating a number of pulses which generally correspond to creating the modified regions to the determined depth.

42 Claims, 12 Drawing Sheets

Related U.S. Application Data filed on Dec. 10, 2012, provisional application No. 61/766,274, filed on Feb. 19, 2013, provisional application No. 61/866,736, filed on Aug. 16, 2013.

(51) Int. Cl.
 B23K 26/36 (2014.01)
 B23K 26/364 (2014.01)
 B23K 103/00 (2006.01)
(58) Field of Classification Search
 USPC .......................................... 219/121.6–121.83
 See application file for complete search history.

(56) References Cited

U.S. PATENT DOCUMENTS

| | | | |
|---|---|---|---|
| 3,543,979 A | 12/1970 | Grove et al. | |
| 3,629,545 A | 12/1971 | Graham et al. | |
| 3,629,546 A | 12/1971 | Fry et al. | |
| 3,751,238 A | 8/1973 | Grego et al. | |
| 3,935,419 A | 1/1976 | Lambert et al. | |
| 4,403,134 A | 9/1983 | Klingel et al. | |
| 4,467,168 A | 8/1984 | Morgan et al. | |
| 4,468,534 A | 8/1984 | Boddicker et al. | |
| 4,639,572 A | 1/1987 | Gruzman et al. | |
| 4,702,042 A | 10/1987 | Herrington et al. | |
| 5,073,687 A * | 12/1991 | Inagawa et al. ........... | 219/121.7 |
| 5,084,604 A | 1/1992 | Dekker et al. | |
| 5,132,505 A | 7/1992 | Zonneveld et al. | |
| 5,609,284 A | 3/1997 | Kondratenko | |
| 5,776,220 A | 7/1998 | Allaire et al. | |
| 5,783,289 A | 7/1998 | Suzuki et al. | |
| 5,826,772 A | 10/1998 | Ariglio et al. | |
| 5,961,852 A | 10/1999 | Rafla-Yuan et al. | |
| 5,984,159 A | 11/1999 | Ostendarp et al. | |
| 6,023,039 A | 2/2000 | Sawada et al. | |
| 6,112,967 A | 9/2000 | Ostendarp et al. | |
| 6,211,488 B1 | 4/2001 | Hoekstra et al. | |
| 6,222,604 B1 | 4/2001 | Suginoya et al. | |
| 6,252,197 B1 | 6/2001 | Hoekstra et al. | |
| 6,259,058 B1 | 7/2001 | Hoekstra | |
| 6,322,958 B1 | 11/2001 | Hayashi | |
| 6,327,875 B1 | 12/2001 | Allaire et al. | |
| 6,420,678 B1 | 7/2002 | Hoekstra | |
| 6,423,930 B1 | 7/2002 | Matsumoto | |
| 6,472,295 B1 | 10/2002 | Morris et al. | |
| 6,489,588 B1 | 12/2002 | Hoekstra et al. | |
| 6,590,181 B2 | 7/2003 | Choo et al. | |
| 6,639,177 B2 * | 10/2003 | Ehrmann et al. ........ | 219/121.68 |
| 6,676,878 B2 | 1/2004 | O'Brien et al. | |
| 6,684,885 B2 | 2/2004 | Graczyk | |
| 6,723,952 B2 | 4/2004 | Choo et al. | |
| 6,734,391 B2 | 5/2004 | Jeon et al. | |
| 6,744,009 B1 | 6/2004 | Xuan et al. | |
| 6,787,732 B1 * | 9/2004 | Xuan et al. ............... | 219/121.67 |
| 6,800,831 B1 | 10/2004 | Hoetzel et al. | |
| 6,811,069 B2 | 11/2004 | Hauer et al. | |
| 6,870,129 B2 | 3/2005 | Hauer et al. | |
| 6,894,249 B1 | 5/2005 | Hauer et al. | |
| 6,919,530 B2 | 7/2005 | Borgeson et al. | |
| 6,992,026 B2 | 1/2006 | Fukuyo et al. | |
| 7,014,082 B2 | 3/2006 | Hauer et al. | |
| 7,211,526 B2 | 5/2007 | Iri et al. | |
| 7,217,448 B2 | 5/2007 | Koyo et al. | |
| 7,304,265 B2 | 12/2007 | Otsu et al. | |
| 7,371,431 B2 | 5/2008 | Dietz et al. | |
| 7,396,742 B2 | 7/2008 | Fukuyo et al. | |
| 7,518,086 B2 * | 4/2009 | Norikane et al. ........ | 219/121.61 |
| 7,528,342 B2 | 5/2009 | Deshi | |
| 7,550,367 B2 * | 6/2009 | Tamura et al. ............... | 438/463 |
| 7,626,137 B2 | 12/2009 | Fukuyo et al. | |
| 7,628,303 B2 | 12/2009 | Hoetzel | |
| 7,629,250 B2 | 12/2009 | Benson et al. | |
| 7,638,730 B2 | 12/2009 | Yoo et al. | |
| 7,642,483 B2 | 1/2010 | You et al. | |
| 7,723,212 B2 | 5/2010 | Yamamoto et al. | |
| 7,723,641 B2 | 5/2010 | Fujii | |
| 7,726,532 B2 | 6/2010 | Gonoe | |
| 7,772,522 B2 | 8/2010 | Matsumoto et al. | |
| 7,812,281 B2 | 10/2010 | Acker et al. | |
| 7,816,623 B2 | 10/2010 | Otsu et al. | |
| 7,820,941 B2 | 10/2010 | Brown et al. | |
| 7,977,602 B2 | 7/2011 | Birrell | |
| 8,011,207 B2 | 9/2011 | Abramov et al. | |
| 8,051,679 B2 | 11/2011 | Abramov et al. | |
| 8,053,704 B2 | 11/2011 | Abramov et al. | |
| 8,067,713 B2 | 11/2011 | Yue | |
| 8,071,960 B2 | 12/2011 | Hoeche | |
| 8,110,776 B2 | 2/2012 | Jung et al. | |
| RE43,400 E | 5/2012 | O'Brien et al. | |
| 8,171,753 B2 | 5/2012 | Abramov et al. | |
| 8,173,038 B2 | 5/2012 | Wagner | |
| 8,183,131 B2 | 5/2012 | Fukuyo et al. | |
| 8,269,138 B2 | 9/2012 | Garner et al. | |
| 8,426,767 B2 | 4/2013 | Glaesemann et al. | |
| 8,543,888 B2 | 9/2013 | Bommena et al. | |
| 8,551,865 B2 | 10/2013 | Fukuyo et al. | |
| 2002/0006765 A1 | 1/2002 | Michel et al. | |
| 2003/0217568 A1 | 11/2003 | Koyo et al. | |
| 2004/0002199 A1 | 1/2004 | Fukuyo et al. | |
| 2004/0060416 A1 | 4/2004 | Luiz | |
| 2004/0086688 A1 | 5/2004 | Hirano et al. | |
| 2004/0144231 A1 | 7/2004 | Hanada | |
| 2004/0169023 A1 | 9/2004 | Tanaka | |
| 2004/0251290 A1 | 12/2004 | Kondratenko | |
| 2005/0009301 A1 | 1/2005 | Nagai et al. | |
| 2005/0029321 A1 | 2/2005 | Hauer et al. | |
| 2005/0199592 A1 | 9/2005 | Iri et al. | |
| 2005/0221044 A1 | 10/2005 | Gaume et al. | |
| 2005/0236378 A1 | 10/2005 | Boyle et al. | |
| 2005/0258135 A1 | 11/2005 | Ishikawa et al. | |
| 2006/0021977 A1 | 2/2006 | Menegus | |
| 2006/0081101 A1 | 4/2006 | Hayashi et al. | |
| 2006/0081571 A1 | 4/2006 | Hoebel et al. | |
| 2006/0101858 A1 | 5/2006 | Fujii | |
| 2006/0137505 A1 | 6/2006 | Wakayama | |
| 2006/0228997 A1 | 10/2006 | Chida et al. | |
| 2007/0039932 A1 | 2/2007 | Haase et al. | |
| 2007/0051706 A1 | 3/2007 | Bovatsek et al. | |
| 2007/0062921 A1 | 3/2007 | Karube et al. | |
| 2007/0111481 A1 | 5/2007 | Tamura et al. | |
| 2007/0125757 A1 * | 6/2007 | Fukuyo .............. | B23K 26/0057 219/121.72 |
| 2007/0151962 A1 | 7/2007 | Doll et al. | |
| 2007/0155131 A1 | 7/2007 | Contes | |
| 2007/0164072 A1 | 7/2007 | Nishio | |
| 2007/0170162 A1 | 7/2007 | Haupt et al. | |
| 2007/0178672 A1 | 8/2007 | Tanaka et al. | |
| 2007/0228100 A1 | 10/2007 | Gonoe | |
| 2008/0000884 A1 | 1/2008 | Sugiura et al. | |
| 2008/0053972 A1 | 3/2008 | Otsu et al. | |
| 2008/0110952 A1 | 5/2008 | Kemmerer et al. | |
| 2008/0128953 A1 | 6/2008 | Nagai et al. | |
| 2008/0194079 A1 | 8/2008 | Yamamoto et al. | |
| 2008/0283509 A1 | 11/2008 | Abramov et al. | |
| 2008/0292844 A1 | 11/2008 | Sabia et al. | |
| 2008/0305615 A1 | 12/2008 | Ueno et al. | |
| 2008/0311817 A1 | 12/2008 | Kawamoto | |
| 2009/0014492 A1 | 1/2009 | Haase | |
| 2009/0040640 A1 | 2/2009 | Kim et al. | |
| 2009/0126403 A1 | 5/2009 | Abramov et al. | |
| 2009/0159580 A1 | 6/2009 | Hsu et al. | |
| 2009/0220761 A1 | 9/2009 | Dejneka et al. | |

(56) References Cited

U.S. PATENT DOCUMENTS

| | | |
|---|---|---|
| 2009/0224432 A1 | 9/2009 | Nagatomo et al. |
| 2009/0294419 A1 | 12/2009 | Abramov et al. |
| 2009/0294420 A1 | 12/2009 | Abramov et al. |
| 2010/0012632 A1 | 1/2010 | Sakamoto |
| 2010/0012633 A1 | 1/2010 | Atsumi et al. |
| 2010/0025387 A1* | 2/2010 | Arai ................. B28D 5/00 219/121.69 |
| 2010/0078417 A1 | 4/2010 | Abramov et al. |
| 2010/0089882 A1 | 4/2010 | Tamura |
| 2010/0119846 A1 | 5/2010 | Sawada |
| 2010/0206008 A1 | 8/2010 | Harvey et al. |
| 2010/0210442 A1 | 8/2010 | Abramov et al. |
| 2010/0212361 A1 | 8/2010 | Abramov et al. |
| 2010/0258993 A1 | 10/2010 | Zhou et al. |
| 2010/0266874 A1 | 10/2010 | Uchiyama et al. |
| 2010/0279067 A1 | 11/2010 | Sabia et al. |
| 2010/0287991 A1 | 11/2010 | Brown et al. |
| 2010/0291353 A1 | 11/2010 | Dejneka et al. |
| 2010/0294748 A1 | 11/2010 | Garner et al. |
| 2011/0000897 A1 | 1/2011 | Nakano et al. |
| 2011/0000898 A1 | 1/2011 | Rumsby |
| 2011/0001220 A1 | 1/2011 | Sugiura et al. |
| 2011/0027971 A1 | 2/2011 | Fukuyo et al. |
| 2011/0037149 A1 | 2/2011 | Fukuyo et al. |
| 2011/0049765 A1 | 3/2011 | Li et al. |
| 2011/0086241 A1 | 4/2011 | Hachitani et al. |
| 2011/0095062 A1 | 4/2011 | Maekawa |
| 2011/0127242 A1 | 6/2011 | Li |
| 2011/0127244 A1 | 6/2011 | Li |
| 2011/0250423 A1 | 10/2011 | Fukasawa et al. |
| 2012/0000894 A1 | 1/2012 | Abramov et al. |
| 2012/0047956 A1 | 3/2012 | Li |
| 2012/0135847 A1 | 5/2012 | Fukasawa et al. |
| 2012/0145331 A1 | 6/2012 | Gomez et al. |
| 2012/0175652 A1 | 7/2012 | Chyr et al. |
| 2013/0133367 A1 | 5/2013 | Abramov et al. |
| 2013/0180665 A2 | 7/2013 | Gomez et al. |
| 2013/0221053 A1 | 8/2013 | Zhang |
| 2013/0224433 A1 | 8/2013 | Matsumoto et al. |
| 2013/0224439 A1 | 8/2013 | Zhang et al. |
| 2013/0323469 A1 | 12/2013 | Abramov et al. |
| 2014/0093693 A1 | 4/2014 | Zhang et al. |

FOREIGN PATENT DOCUMENTS

| | | |
|---|---|---|
| EP | 1341730 B1 | 8/2005 |
| GB | 1222182 A | 2/1971 |
| JP | 200219528 A | 8/2000 |
| JP | 2001058281 A | 3/2001 |
| JP | 2001080928 A | 3/2001 |
| JP | 2004010466 A | 1/2004 |
| JP | 2004083378 A | 3/2004 |
| JP | 2004223796 A | 8/2004 |
| JP | 2004352535 A | 12/2004 |
| JP | 2005088078 A | 4/2005 |
| JP | 2005212473 A | 8/2005 |
| JP | 2006159747 A | 6/2006 |
| JP | 2008007360 A | 1/2008 |
| JP | 2008007384 A | 1/2008 |
| JP | 2008115067 A | 5/2008 |
| JP | 2008229711 A | 10/2008 |
| JP | 2008247038 A | 10/2008 |
| JP | 2009012038 A | 1/2009 |
| JP | 2009066851 A | 4/2009 |
| JP | 2009090598 A | 4/2009 |
| JP | 2009280452 A | 12/2009 |
| JP | 2010150068 A | 7/2010 |
| KR | 10-2007-0074297 A | 7/2007 |
| TW | 200307586 A | 12/2003 |
| TW | 200811072 A | 3/2008 |
| WO | WO02/100620 A1 | 12/2002 |
| WO | WO03/008352 A1 | 1/2003 |
| WO | WO2004/014625 A1 | 2/2004 |
| WO | WO2007/094348 A1 | 8/2007 |
| WO | WO2010/138451 A1 | 12/2010 |

OTHER PUBLICATIONS

Written Opinion of PCT/US2013/061162, 11 pages.

Keming Du, et al., "Subsurface Precision Machining of Glass Substrates by Innovative Lasers", Class Sci. Technol. 76, No. 2, 2003, p. 95-98.

Iopscience.iop.org, "Laser Processing of Glass by Picosecond Pulses", 1994 Quantum Electron. 24 732, 5 pages.

Rainer James Beck, "Adaptive Optics for Laser Processing", Herio-Watt University, School of Engineering and Physical Sciences, Oct. 2011, 180 Pages.

Non-Final Office Action dated Nov. 26, 2013, related to U.S. Appl. No. 12/952,935.

Non-Final Office Action dated Feb. 4, 2015, related to U.S. Appl. No. 13/836,717.

Final Office Action dated Sep. 18, 2015, related to U.S. Appl. No. 13/836,717.

Notice of Allowance dated Jan. 16, 2014, related to U.S. Appl. No. 13/217,718.

International Search Report & Written Opinion related to the PCT/US2013/044208 filed Jun. 5, 2013.

Karube et al., "Laser-Induced Cleavage of LCD Glass as Full-Body Cutting", Proceeding of SPIE, vol. 6880, 2008, pp. 68807-1 to 68807-10. (Please see the document was cited in the U.S. Appl. No. 13/836,717).

Yamamoto et al., "Three-Dimensional Thermal Stress Analysis on Laser Scribing of Glass", Precision Engineering 32, 2008, p. 301-308. (Please see the document was cited in the U.S. Appl. No. 13/836,717).

Yamamoto et al., "Thermal Stress Analysis on Laser Scribing of Glass", Journal of Laser Applications, vol. 20, No. 4, 2008, pp. 193-200. (Please see the document was cited in the U.S. Appl. No. 13/836,717).

Taiwan Office Action and Search Report dated Apr. 28, 2015 related to TW application No. 99128996 (Please see the document was cited in the U.S. Appl. No. 13/836,717).

Taiwan Notice of allowance dated Jun. 2, 2015 related to TW application No. 99140582 (Please see the document was cited in the U.S. Appl. No. 13/836,717).

English translation of the Apr. 6, 2016 Office action concerning Chinese Patent Application No. 2016033101364760, which corresponds with U.S. Appl. No. 14/032,829.

Notice of Allowance for U.S. Appl. No. 13/836,717, mailed Aug. 1, 2016. 11 pages.

* cited by examiner

METHOD AND APPARATUS FOR SEPARATION OF WORKPIECES AND ARTICLES PRODUCED THEREBY

CROSS REFERENCE TO RELATED APPLICATIONS

This application is a U.S. Non-Provisional application. This application claims benefit of the U.S. Provisional Application Nos. 61/866,736, filed on 16 Aug. 2013, 61/766,274, filed 19 Feb. 2013, 61/735,489, filed 10 Dec. 2012 and 61/704,038, filed 21 Set. 2012 the contents of which are herein incorporated by reference in their entirety for all purposes.

BACKGROUND

Embodiments of the present invention relate generally to methods for separating workpieces such as sheets of glass, wafers, substrates, etc.

Hard optical materials including thin glass substrates, whether chemically-strengthened, thermally-strengthened or unstrengthened, have found wide-spread application in consumer electronics and other industries. For example, chemically- and thermally-strengthened glass substrates have been used as cover substrates for LCD and LED displays and touch applications incorporated in mobile telephones, display devices such as televisions and computer monitors, and various other electronic devices. To reduce costs associated with manufacturing such consumer electronics devices, large or common substrates are transported from the hard optical materials manufacturer to the materials user and then the user singulates the individual substrates from the common substrate using a device such as a mechanical scoring wheel or a laser.

Singulating individual glass substrates from a common glass substrate, however, can be difficult, especially when the common glass substrate is formed of chemically or thermally strengthened glass. For example, the magnitude of compressive stress and the elastic energy stored within the central tension region may make cutting and finishing of chemically or thermally strengthened glass difficult. The high surface compression and deep compression layers make it difficult to mechanically scribe the glass substrate as in traditional scribe-and-bend processes. Furthermore, if the stored elastic energy in the central tension region is sufficiently high, the glass may break in an explosive manner when the surface compression layer is penetrated. In other instances, the release of the elastic energy may cause the break to deviate from a separation path. Similarly, there are difficulties with separating or singulating other hard optical materials adaptable for use as cover materials for electronic displays such as corundum, ceramics, semiconductors, metal or metal alloys, and glass-ceramics. Accordingly, a need exists for reliable methods for separating hard optical material including strengthened glass substrates.

DETAILED DESCRIPTION OF THE ILLUSTRATED EMBODIMENTS

Figure 1A:
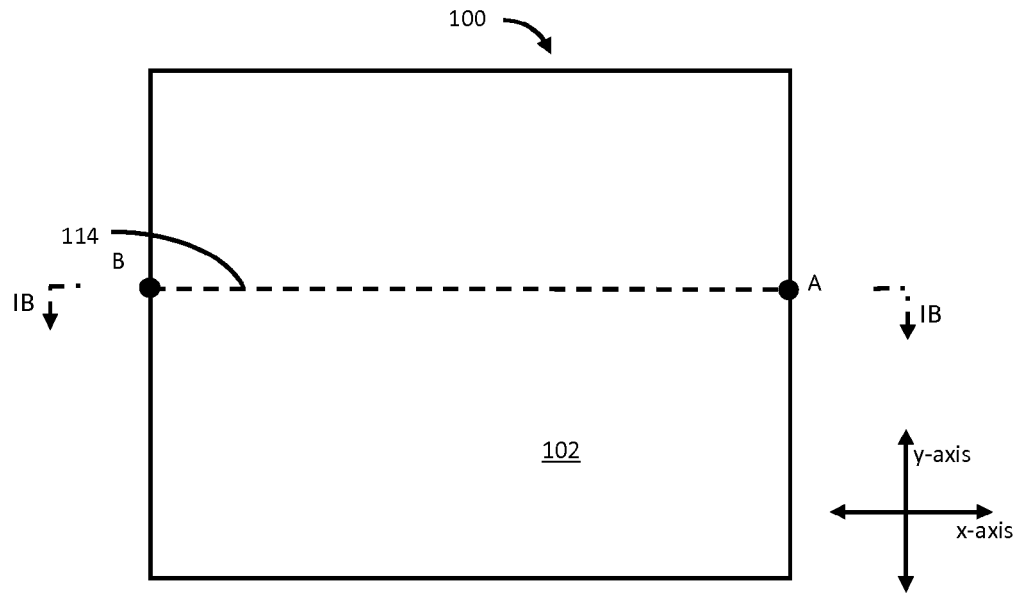
FIG. 1A is a plan view illustrating a workpiece that, according to one or more embodiments exemplarily described herein, may be separated along one embodiment of a separation path.

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art.

In the drawings, the sizes and relative sizes of components may be exaggerated for clarity. The terminology used herein is for the purpose of describing particular example embodiments only and is not intended to be limiting. It is to be understood that various orientational terms such as "front" and "back" and "rear", "left" and "right", "top" and "bottom", "upper" and lower" and the like are used herein only for convenience, and not with the intention of limiting what is described to any absolute or fixed orientation relative to any environment in which any described structures may be used.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges there between.

As will be discussed in greater detail below, some embodiments exemplarily described herein can be generally characterized as a method of modifying a plurality of regions within a workpiece (e.g., provided as a sheet, plate, substrate, etc., comprising one or more materials or layers of materials) to thereby form a plurality of modified regions within the workpiece. A modified region may include one or more cracks, fractures, voids, densified regions, or the like or a combination thereof, formed within the workpiece. Generally, a workpiece can be characterized as having a first surface, a second surface opposite the first surface, and an interior between the first surface and the second surface, and the modified regions are arranged within the workpiece along a separation path. As will be discussed in greater detail below, the modification regions are formed within the workpiece according to a workpiece modification process that involves directing a beam of laser pulses onto the workpiece such that laser pulses within the beam are incident upon the workpiece at the first surface and thereafter pass into the interior of the workpiece towards the second surface. The workpiece modification process may be carried out to form one or more modified regions that extend from the second surface to the first surface, extend from the second surface into the interior and terminate at a location spaced apart from the first surface, extend within the interior but are spaced apart from the first surface and the second surfaced, or any combination thereof.

In one embodiment, the workpiece may be internally stressed (e.g., by virtue of the composition of the workpiece at various locations within the interior thereof, by virtue of the process by which it was formed, or the like, or a combination thereof). In such an embodiment, one or more stress fields may be generated within the interior of the workpiece upon forming the modified regions, which generally surround the modified regions and extend along the separation path. Depending upon factors such as the height to which the modified regions extend through the workpiece, the internal stresses within the workpiece, etc., the one or more stress fields may be sufficient to create and/or propagate one or more cracks through the interior of the workpiece (e.g., so as to extend completely between the first surface and the second surface) so as to spontaneously separate the workpiece along the separation path. The time it takes for a workpiece to spontaneously separate along the separation path can generally correspond to, for example, the magnitude of the internal stresses within the workpiece prior to formation of the modified regions, the number of modified regions formed along the separation path, the distance between adjacent modified regions along the separation path, the height to which the modified regions extend into the workpiece, or the like or a combination thereof.

In another embodiment, a workpiece (e.g., an internally stressed workpiece or a workpiece with no or negligible internal stresses) may be beneficially stressed (e.g., by heating the workpiece, by cooling the workpiece, by bending the workpiece, by mechanically impacting the workpiece, by forming a vent, groove or crack within the workpiece that extends further into the workpiece than the modified regions, or the like or a combination thereof) after forming the modified regions, to generate the aforementioned one or more stress fields to create and/or propagate one or more cracks through the interior of the workpiece (e.g., so as to extend completely between the first surface and the second surface) and separate the workpiece along the separation path.

Generally, the workpiece may be formed of a material such as a corundum, including sapphire, a ceramic, a semiconductor, a metal or metal alloy, a glass, a glass-ceramic, or the like or a combination thereof. Exemplary ceramic materials from which the workpiece can be formed include alumina, beryllia, zirconia, or the like or a combination thereof. Exemplary semiconductor materials from which the workpiece can be formed include elemental or compound semiconductors (e.g., silicon, germanium, silicon-germanium, silicon carbide, or the like or a combination thereof), semiconductor oxides, or the like, or a combination thereof. Exemplary metals and metal alloys from which the workpiece can be formed include aluminum, indium, titanium, zinc, stainless steel, or the like, alloys thereof, oxide thereof, nitrides thereof, or the like or any combination thereof. Exemplary glasses from which the workpiece can be formed include soda-lime glass, borosilicate glass, aluminosilicate glass, aluminoborosilicate glass, sodium-aluminosilicate glass, calcium-aluminosilicate glass, phosphate glass, fluoride glass, chalcogenide glass, bulk metallic glass, or the like, or any combination thereof. When formed of a glass, the workpiece may be chemically-strengthened, thermally strengthened, or the like, or a combination thereof, or may be unstrengthened.

An exemplary embodiment of a workpiece that may be subjected to a workpiece modification process, and modified regions thus formed, will now be described with respect to FIGS. 1A, 1B and 2.

Figure 1B:
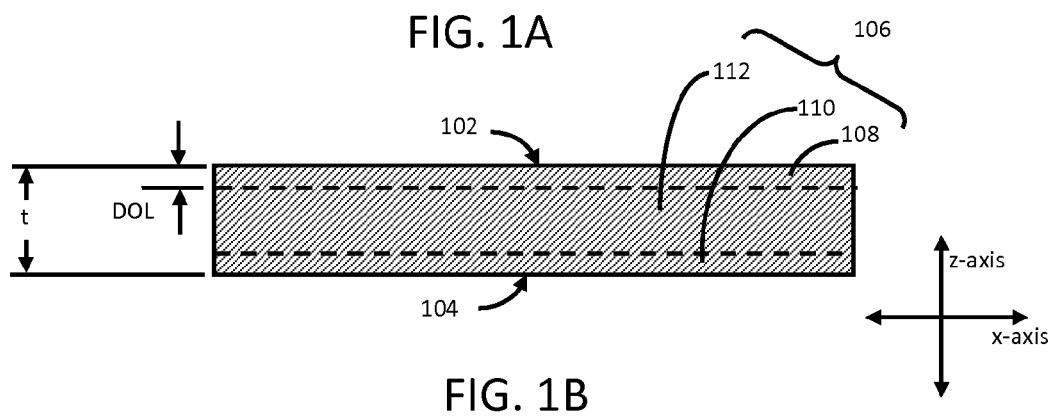
FIG. 1B is a cross-sectional view, taken along line IB-IB shown in FIG. 1A, illustrating one embodiment of a workpiece that may be separated along the separation path.

Referring to FIGS. 1A and 1B, a workpiece 100 may have a first surface 102, a second surface 104 opposite the first surface 102, an interior 106 between the first surface 102 and the second surface 104 and an edge surface extending around the perimeter of the workpiece 100 (e.g., from the first surface 102 to the second surface 104). In one embodiment, the lateral dimension the workpiece 100 (e.g., measured along the x-axis) may be in a range from 300 mm to 1500 mm (or thereabout) and the lateral dimension the workpiece 100 (e.g., measured along the y-axis) may be in a range from 400 mm to 1800 mm (or thereabout). It will be appreciated, however, that the lateral dimensions of the workpiece 100 may be varied as suitable or beneficial. In the illustrated embodiment, the first surface 102 and the second surface 104 are both substantially flat and parallel to one another. Accordingly, the distance from the first surface 102 and the second surface 104 can define the thickness, t, of the workpiece 100. In one embodiment, the thickness of the workpiece 100 is in a range from 200 μm to 10 mm (e.g., less than 1 mm, less than 0.7 mm, less 0.5 mm, less than 0.4 mm, or thereabout). In another embodiment, however, the thickness of the workpiece 100 can be less than 200 μm or greater than 10 mm. In yet another embodiment, the first surface 102 and the second surface 104 may not be substantially flat, may not be parallel to one another, or a combination thereof.

In the illustrated embodiment, the workpiece 100 is an internally stressed workpiece formed of chemically strengthened glass, having a first compression region 108 extending from the first surface 102 into the interior 106, a second compression region 110 extending from the second surface 104 into the interior 106, and a central tension region 112 extending between the first compression region 108 and the second compression region 110. Portions of the workpiece 100 located with the first compression region 108 and the second compression region 110 are under a state of compression whereas the portion of workpiece 100 within the central tension region 112 is under a state of tension. The thickness of the first compression region 108 (and, likewise, the thickness of the second compression region 110) is known as the "depth of layer" or "DOL." Generally, the surface compression at each of the first surface 102 and the second surface 104 can be in a range from 69 MPa to 1 GPa (e.g., greater than 100 MPa, greater than 300 MPa, greater than 500 MPa, greater than 700 MPa, greater than 900 MPa, or thereabout). In other embodiments, however, the surface compression at any of the first surface 102 or second surface 104 can be less than 69 MPa or greater than 1 GPa. Generally, the DOL can be in a range from 20 μm to 100 μm. In other embodiments, however, the DOL can be less than 20 μm or greater than 100 μm. The maximum tensile stress of the sheet within the tension region can be determined by the following formula:

$$CT = \frac{CS \times DOL}{t - 2 \times DOL}$$

where CS is the aforementioned surface compression at the first surface 102 and second surface 104, t is the thickness of the workpiece 100 (expressed in millimeters, mm), DOL is the depth of layer of the compression region(s) (expressed in mm), and CT is the maximum central tension within the workpiece 100 (expressed in MPa).

As will be described in greater detail below, the aforementioned workpiece modification process is performed by operating a beam source to direct a beam of laser pulses from a laser head thereof onto the workpiece 100 (e.g., such that laser pulses within the beam are incident upon the workpiece 100 at the first surface 102 and thereafter pass into the interior 106 of the workpiece towards the second surface 104). While the beam is directed onto the workpiece 100, relative motion between the workpiece 100 and the beam is induced (e.g., by moving the workpiece 100 relative to the beam, by moving the beam relative to the workpiece 100, or a combination thereof) such that the beam of laser pulses is translated through the first surface 102 along a separation path 114 (e.g., between points A and B) at least once. Although the separation path 114 is illustrated as straight, it will be appreciated that at least a part of the separation path 114 may be curved. In one embodiment, the beam of laser pulses is translated so as to be collinear with the separation path 114 at least once. In another embodiment, the beam of laser pulses is translated so as to be offset from one or both sides of (but parallel to) the separation path 114 at least once. Generally, the beam can be translated through the first surface 102 (e.g., from point A to point B) at a scan rate in a range from 200 mm/s to 1000 mm/s. Of course, the scan rate may be less than 200 mm/s. Further, depending upon factors such as, for example, the geometry of the separation path 114, the maximum (or fastest suitable) speed with which the workpiece 100 can be moved, the maximum (or fastest suitable) speed with which the laser head of the laser beam source can be moved, the maximum frequency with which any beam positioners present within the laser beam source can be operated, or the like or any combination thereof, the scan rate may be greater than 1000 mm/s.

Figure 2:
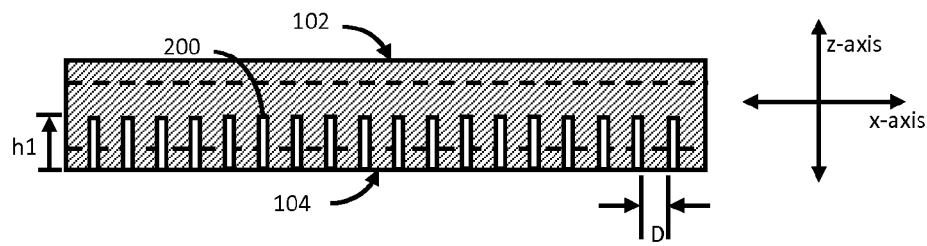
FIG. 2 is a cross-sectional view of the workpiece shown in FIG. 1B, after a plurality of modified regions have been formed along the separation path.

Referring to FIG. 2, upon performing the workpiece modification process, a plurality of modified regions, such as modified regions 200, are formed within the workpiece 100. As exemplarily illustrated, each modified region 200 extends from the second surface 104 into the interior to a height, h1, which is greater than DOL. Accordingly, each modified region 200 may extend through the second compression region 110 and terminate within the central tension region 112. Generally, h1 can be in a range from 30% to 60% of the thickness, t, of the workpiece 100. Although FIG. 2 illustrates each modified region 200 as extending to the same (or at least substantially the same) height, h1, it will be appreciated that the parameters of the workpiece modification process may be altered or otherwise controlled such that at least one modified region 200 extends into the interior 106 to a height that is different from another modified region 200. Although FIG. 2 illustrates each modified region 200 as terminating within the central tension region 112, it will be appreciated that the parameters of the workpiece modification process may be altered or otherwise controlled such that at least one modified region 200 terminates within the second compression region 110 or the first compression region 108.

As exemplarily illustrated, each modified region 200 extends orthogonally (or at least substantially orthogonally) from the second surface 104 (e.g., relative to one or both of the x- and y-axes), along a straight line (or along at least substantially straight line) (e.g., along the z-axis) into the workpiece 100. In another embodiment, however, the workpiece modification process may be performed such that at least one of the modified regions 200 extends substantially non-orthogonally from the second surface 104 along a straight line (or along at least substantially straight line) into the workpiece 100. In still another embodiment, the workpiece modification process may be performed such that at least one of the modified regions 200 extends from the second surface into the workpiece 100 along a curved, bent or otherwise non-straight line. Further, although the modified regions 200 are illustrated as extending into the interior 106 of the workpiece 100 so as to be parallel (or at least substantially parallel to one another), the workpiece modification process may be performed such that at least two of the modified regions 200 extend into the interior 106 of the workpiece 100 so as to be substantially oblique with respect to one another (or even perpendicular or at least substantially perpendicular to one another).

As exemplarily illustrated, each modified region 200 is spaced apart from an adjacent modified region (measured along the second surface 104) by a distance, D, which is in a range from 100 μm to 300 μm Depending upon factors such as, for example, the aforementioned scan rate, the maximum frequency with which a beam positioner present within the laser beam source can be operated, the height h1 to which the modified regions extend into the interior 106, the orientation of the modified regions 200 within the interior 106 of the workpiece 100, or the like or any combination thereof, the distance D may be less than 100 μm or greater than 300 μm Although the distance between adjacent modified regions 200 is illustrated as being constant (or at least substantially constant) along the separation path 114, it will be appreciated that the workpiece modification process may be performed to vary the distance between adjacent modified regions 200 along the separation path 114.

An exemplary embodiment of a workpiece modification process will now be described with respect to FIGS. 3A, 3B, 4A, 4B, 5A and 5B.

Figure 3A:
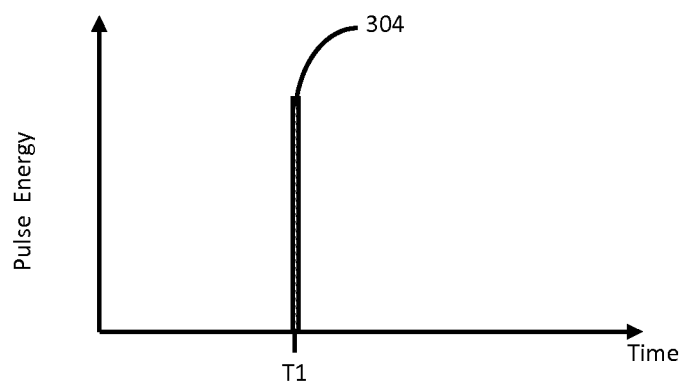
FIGS. 3A, 4A and 5A are pulse timing charts illustrating the pulse timing with which laser pulses can be directed to impinge upon the workpiece to form the modified regions shown in FIG. 2.
Figure 3B:
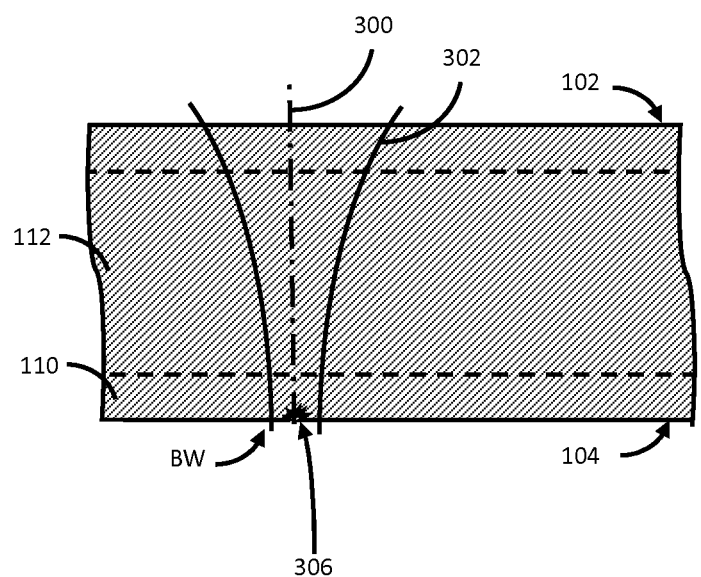
FIGS. 3B, 4B and 5B are enlarged cross-sectional views schematically illustrating various stages of the formation of modified regions as a result of laser pulses impinging upon the workpiece according to the pulse timing shown in FIGS. 3A, 4A and 5A, respectively.
Figure 4A:
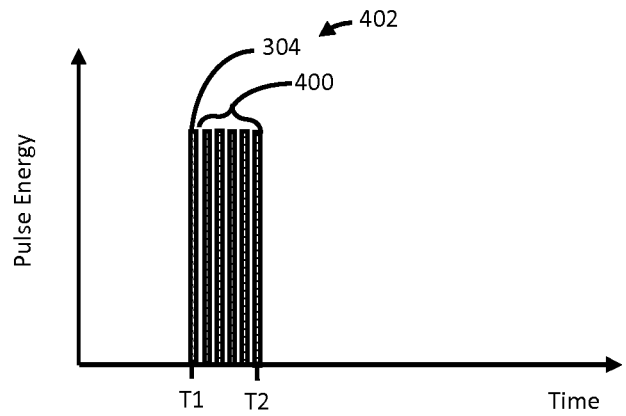
Figure 4B:
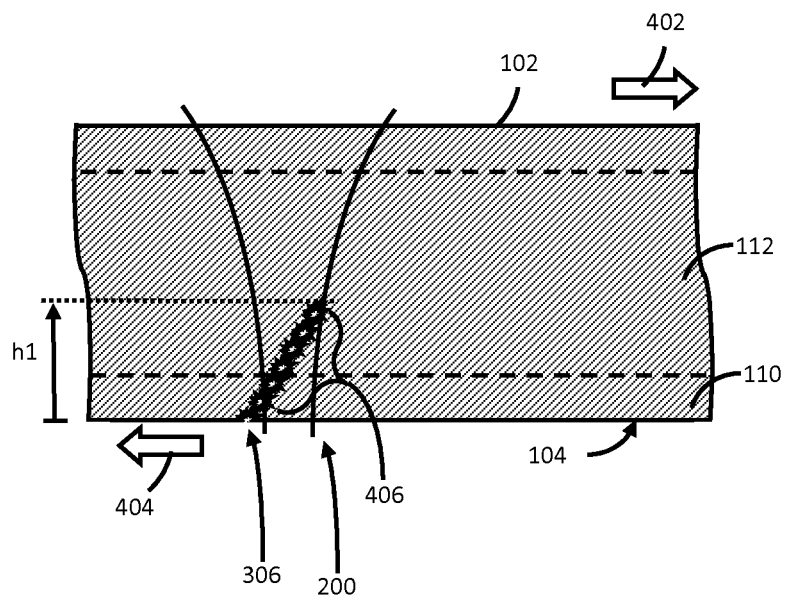
Figure 5A:
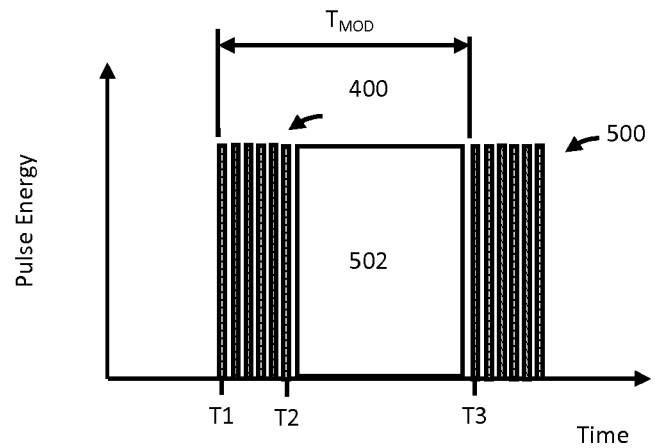
Figure 5B:
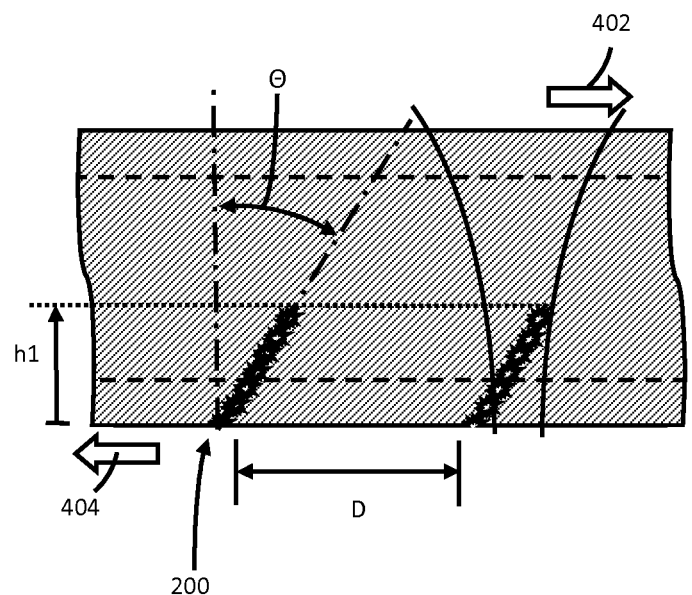

Referring generally to FIGS. 3A, 3B, 4A, 4B, 5A and 5B, a beam source (not shown) can be operated to generate a beam of laser pulses configured to modify (e.g., crack, ablate, melt, disrupt, etc.) a portion of the workpiece 100. Generally, laser pulses within the beam have a wavelength to which the workpiece 100 is at least suitably or beneficially transparent so that the beam can be directed (e.g., along an optical axis 300, as shown in FIG. 3B) onto the first surface 102 and thereafter pass into the interior 106 of the workpiece 100 and through the second surface 104. In the illustrated embodiment, the optical axis 300 is oriented relative to the workpiece 100 such that the optical axis 300 is orthogonal (or at least substantially orthogonal) to the first surface 102 of the workpiece 100. For example, the optical axis 300 is parallel to (or at least substantially parallel to) the z-axis, and the first surface 102 may lie (or at least substantially lie) within a plane defined by the x and y axes. In other embodiments, and as will be discussed in greater detail below, the optical axis 300 may be substantially oblique with respect to the first surface 102. In one embodiment, laser pulses within the beam can have a wavelength in the ultraviolet spectrum (e.g., 355 nm or thereabout) or in the visible spectrum (e.g., in the green spectrum which includes 532 nm, or thereabout). The beam may be focused to produce a beam with a spatial intensity distribution 302 (also referred to as "beam profile") having a beam waist BW located at the second surface 104 or near the second surface 104. Although FIGS. 3B, 4B and 5B illustrate an embodiment in which the beam waist BW near the second surface 104 at a location outside the workpiece 100, the BW may be near the second surface 104 at a location within the interior 106 of the workpiece 100. As used herein, the beam waist BW is "near" the second surface 104 when the beam waist BW is spaced apart from the second surface by a distance of less than 3 mm (e.g., less than 1.5 mm, less than 1 mm, less than 0.5 mm, less than 0.1 mm, less than 0.05 mm, or the like). The beam may include laser pulses having a pulse duration in a range from 18 ns to 20 ns, a peak pulse power in a range from 2 W to 10 W and may have a pulse repetition rate in a range from 90 kHz to 120 kHz. It will nevertheless be appreciated that characteristics such as pulse duration, peak pulse power and pulse repetition rate may be varied to be above or below the ranges stated above.

Configured as exemplarily described above, the intensity and/or fluence of laser pulses directed along the optical axis 300 of the beam generally increases as the laser pulses approach the beam waist BW of the beam, and reach a maximum at the beam waist BW. Thus, non-linear absorption (e.g., multi-photon absorption, avalanche absorption, or the like or a combination thereof) of the electromagnetic radiation within a laser pulse may be induced within material of the workpiece 100 present at or near the beam waist BW, whereas little or no absorption of electromagnetic radiation within a laser pulse may occur within material of the workpiece 100 further away from the beam waist BW. Thus, absent a pre-existing defect within the workpiece, a laser pulse within the beam will modify (e.g., crack, ablate, melt, disrupt, etc.) a portion of the workpiece 100 that is located at or near the beam waist BW. However, additional portions of the workpiece, which would otherwise be too far from the beam waist BW to be modified, may nevertheless be modified upon directing additional laser pulses onto the workpiece 100, even when the position of the beam waist BW along the optical axis 300 is maintained.

Thus to form a modified region 200, and with reference to FIGS. 3A and 3B, a first laser pulse such as laser pulse 304 is directed onto the workpiece 100 at a time T1. The first laser pulse 304 is transmitted along the optical axis 300 through the workpiece 100 with little or no absorption until it approaches the beam waist BW where it rapidly attains an intensity and/or fluence sufficient to induce non-linear absorption within the workpiece 100 to modify (e.g., crack, ablate, melt, disrupt, etc.) an initial disrupted portion 306 of the workpiece 100 at the second surface 104. Thereafter, and with reference to FIGS. 4A and 4B, the subsequent laser pulses, such as laser pulses 400, may be directed onto the workpiece 100 while the relative motion between the beam and the workpiece 100 is induced (e.g., by moving the workpiece 100 along the direction indicated by arrow 402 (workpiece movement direction arrow), by scanning the beam along the direction indicated by arrow 404 (beam movement direction arrow), or a combination thereof). While pulse energies of pulses 304, 400, and 500 are illustrated as uniform, this only for convenience. The subsequent laser pulses 400 are sequentially transmitted along the optical axis 300 through the workpiece 100 with little or no absorption until each approaches a portion of the workpiece 100 that was modified by a previously-directed laser pulse where its intensity and/or fluence, which would otherwise be insufficient to modify (e.g., crack, ablate, melt, disrupt, etc.) the workpiece 100, is sufficient to modify (e.g., crack, ablate, melt, disrupt, etc.) a portion of the workpiece 100 adjoining a previously-modified portion of the workpiece 100. Thus, while the beam and the workpiece 100 experience relative motion there between, a subsequently-directed laser pulse may be directed onto the workpiece 100 to illuminate a previously-modified portion of the workpiece 100, thus modifying (e.g., cracking, ablating, melting, disrupting, etc.) an additional portion of the workpiece 100.

The process of illuminating previously-modified portions of the workpiece 100 may continue until a modified region such as modified region 200, including subsequent disrupted portions 406, is formed to extend from the second surface 104 into the interior 106 to a suitable or beneficial height (e.g., aforementioned height, h1). A suitable or beneficial height will be one which will not cause detrimental effects such as shattering discussed earlier and will serve to accurately and reliably control separation of workpiece 100 from the common substrate. A suitable or beneficial height will be a function of a variety of characteristics of the common substrate. These include the basic composition of the material of the substrate, how is has been treated, such as for hardness, its thickness, and its temperature at the time of separation. To terminate the formation of the modified region 200 within the workpiece 100 while the beam and the workpiece 100 experience relative motion there between, one or more characteristics of the beam or its pulses may be modified to form pulses of changed characteristic 502. For example, an orientation of the optical axis 300 relative to the workpiece 100 may be changed (e.g., using an acousto-optic (AO) modulator (AOM), an AO deflector (AOD), an electro-optic (EO) modulator (EOM), an EO deflector (EOD), a fast steering mirror, a galvanometric mirror, or the like or a combination thereof, as a beam positioner or system of beam positioners) such that that a previously-modified portion within the workpiece 100 is not illuminated by a subsequently-directed laser pulse (or is illuminated by only a portion of a subsequently-directed laser pulse, or is illuminated by a subsequently-directed laser pulse having an intensity and/or fluence that is insufficient to modify a portion of the workpiece 100 adjoining the previously-modified portion, or the like or a combination thereof). In another example, a temporal characteristic of the beam (e.g., pulse repetition rate, pulse duration, temporal shape, or the like or a combination thereof) may be changed such that that a previously-modified portion within the workpiece 100 is not illuminated by a subsequently-directed laser pulse. Further, it has been discovered that size, shape and orientation of a modified portion within the workpiece 100 generally corresponds to the size, shape and orientation of a spot illuminated on the workpiece 100 by a directed laser pulse. Thus, in another example, a spatial characteristic of the beam (e.g., laser pulse spot shape, laser pulse spot size, laser pulse spot orientation relative to the separation path, or the like or a combination thereof) may be changed such that that a previously-modified portion within the workpiece 100 is not illuminated by a subsequently-directed laser pulse (or is illuminated by only a portion of a subsequently-directed laser pulse, or is illuminated by a subsequently-directed laser pulse having an intensity and/or fluence that is insufficient to modify a portion of the workpiece 100 adjoining the previously-modified portion, or the like or a combination thereof).

In the embodiment illustrated in FIGS. 5A and 5B, the formation of the aforementioned modified region 200 is terminated by interrupting or otherwise changing the pulse repetition rate of the beam so as to generate at least a follow-on burst 500 of laser pulses, wherein a time period between a first burst of pulses comprising initial burst 304 and subsequent pulses 400 and follow-on burst 500 is less than a time period between consecutive bursts 500. In one embodiment, a time period between consecutive bursts 500 is in a range from 10 ns to 1 ms (e.g., in a range from 50 μs to 500 μs) or thereabout. In one embodiment, the Duty Cycle during a modification period can be in a range between 0% and 100% (e.g., in a range from 10% to 50%, or more or less depending on the scan rate of the workpiece 100, etc.).

One or more or all bursts 500 of laser pulses may be generated by any suitable or beneficial method or combination of methods. For example, a burst 500 of laser pulses may be generated directly by a laser capable of operation in burst mode. In another example, a burst 500 of laser pulses may be generated by first generating a preliminary beam of laser pulses at a constant pulse repetition rate and modifying the preliminary beam of laser pulses (e.g., using an acousto-optic (AO) modulator (AOM), an AO deflector (AOD), an electro-optic (EO) modulator (EOM), an EO deflector (EOD), a fast shutter, a laser trigger, or the like or a combination thereof).

Although FIG. 5A illustrates an embodiment in which each burst 500 consists of five laser pulses, it will be appreciated that any burst 500 may include any number of laser pulses in a range from 2 to 100 or more laser pulses (e.g., 3 to 7 laser pulses) depending upon such factors as the material of the workpiece 100, the wavelength of light within the laser pulses, the pulse duration, the peak pulse power, the desired height to which a modified region is to extend into the workpiece 100, or the like or a combination thereof. It will be appreciated that a burst 500 may further include a single laser pulse. Although FIG. 5A illustrates an embodiment in which each laser pulse within a burst has the same pulse duration, peak pulse power and temporal pulse energy profile, it will be appreciated that different laser pulses within the same burst may have different pulse durations, peak pulse powers, temporal pulse energy profiles, or the like or a combination thereof).

In the embodiment exemplarily illustrated in FIG. 5B, the modified region 200 extends non-orthogonally from the second surface 104 and is biased in the direction along which the workpiece 100 is scanned (e.g., in the direction indicated by arrow 402). However it is been discovered that, for a given rate of relative motion between the beam and the workpiece 100, the inclination angle $\Theta$ of a modified region such as modified region 200 may change depending upon the wavelength of laser pulses within the beam. For example, laser pulses having a wavelength in the visible green spectrum tend to produce modification regions extending from the second surface 104 at an inclination angle $\Theta$ larger than that of modification regions produced by laser pulses having a wavelength in the ultraviolet spectrum. In particular, the laser pulses having a wavelength in the ultraviolet spectrum tend to produce modification regions extending from the second surface 104 at an inclination angle $\Theta$ that is almost or substantially zero degrees. Regardless of the wavelength of laser pulses within the beam, the orientation of the optical axis 300 relative to the workpiece 100 may be adjusted during the relative motion between the beam and the workpiece 100 to control the inclination angle $\Theta$ of each modified region 200 (e.g., to ensure that each modified region 200 extends from the second surface 104 at an inclination angle $\Theta$ that is at least substantially zero degrees). By reducing the inclination angle $\Theta$ of the modified regions 200, the distance between adjacent modified regions 200 along the separation path 114 can be reduced, thus allowing an increased number of modified regions 200 to be formed along the separation path 114, which can facilitate suitable or beneficial separation of the workpiece 100 along the separation path 114. As can be seen in FIG. 5B inclination angle $\Theta$ can be at least as much as about 30°. Depending upon the material, optimum inclination angle $\Theta$ can be about 0°, through about 30° in increments of about 1°.

As mentioned above, it has been discovered that size, shape and orientation of a modified portion within the workpiece 100 generally corresponds to the size, shape and orientation of a spot illuminated on workpiece 100 by a directed laser pulse. Accordingly, in one embodiment, a spatial characteristic of the beam (e.g., laser pulse spot shape, laser pulse spot size, laser pulse spot orientation relative to the separation path, or the like or a combination thereof) may be selected to suitably or beneficially facilitate separation of the workpiece 100 along the separation path 114. In one embodiment, laser pulses directed onto the workpiece 100 may impinge the workpiece 100 (e.g., at the first surface 102) at a spot having a non-circular shape (e.g., an elliptical shape, a rectangular shape, etc.) characterized as having a relatively large dimension along a first (or major) axis of the shape and a relatively small dimension along a second (or minor) axis of the shape. The orientation of the spot may be selected, adjusted, changed or otherwise controlled such that first (or major) axis of the non-circular shape is aligned with (e.g., so as to be parallel to, or at least substantially parallel to) the separation path 114. To create a laser pulse spot having a non-circular shape, the aforementioned beam source may include a beam shaper (also referred to herein as a "shaper") configured to shape laser pulses generated by a laser. Exemplary shapers that may be used include a beam cropper having a slit formed therein, a prism pair, an AOD or AOM system configured to chirp laser pulses, or the like or a combination thereof. To adjust the orientation of the laser pulse spot, the aforementioned beam source may include a beam rotator (also referred to herein as a "rotator") configured to rotate laser pulses generated by the laser, rotate optics through which the laser pulses generated by the laser, rotate the shaper, or the like or a combination thereof. In one embodiment, the rotator may include a dove prism configured to rotate the laser pulse spot between two orientations oriented at 90 degrees relative to one another.

Figure 6:
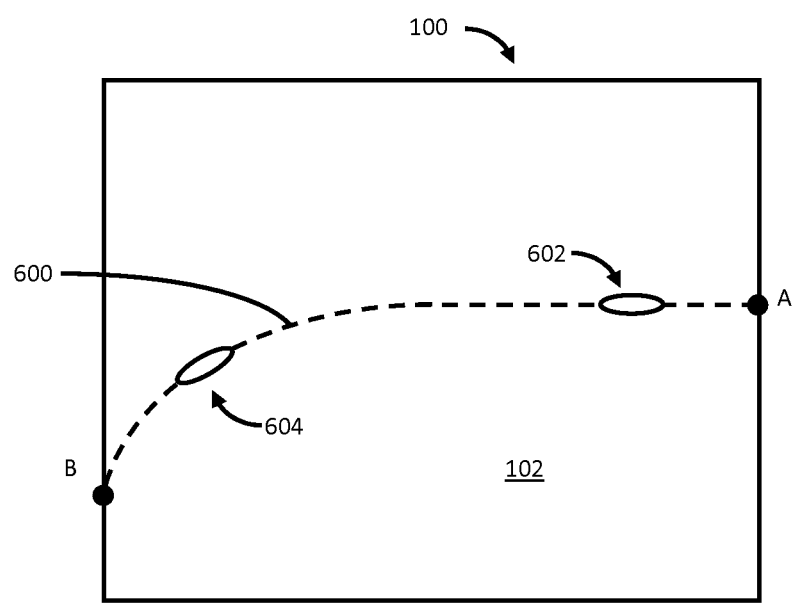
FIG. 6 is a plan view illustrating another embodiment of a separation path, along which a workpiece may be separated, according to one or more embodiments exemplarily described herein.

For example, with reference to FIG. 6, laser pulses may impinge the first surface 102 of the workpiece 100 at a first position along a separation path 600 to define a laser pulse spot 602 having a non-circular shape (e.g., an elliptical shape). The spot 602 may be oriented such that the major axis of the spot 602 is aligned so as to be parallel to the separation path 600 at the first position. In another embodiment, the orientation of the spot may be adjusted to correspond to differences in geometry at different positions along the separation path 600. For example, laser pulses may impinge the first surface 102 of the workpiece 100 at a second position along a separation path 600 to define a laser pulse spot 604 having a non-circular shape (e.g., an elliptical shape) that has a different orientation (relative to the first surface 102) than the spot 602. Like the spot 602, however, the major axis of the spot 604 may be aligned so as to be parallel to the separation path 600 at the second position. In one embodiment, the dimension of the spot 602 (or 604) along the major axis may be at larger than (e.g., at least twice as large as) the dimension of the spot 602 (or 604) along the minor axis.

Having exemplarily described various embodiments of a workpiece modification process above, some exemplary embodiments of a workpiece processing apparatus including a beam source, which may be operated to form modified regions such as those exemplarily described above, will now be described with respect to FIGS. 7 to 11.

Figure 7:
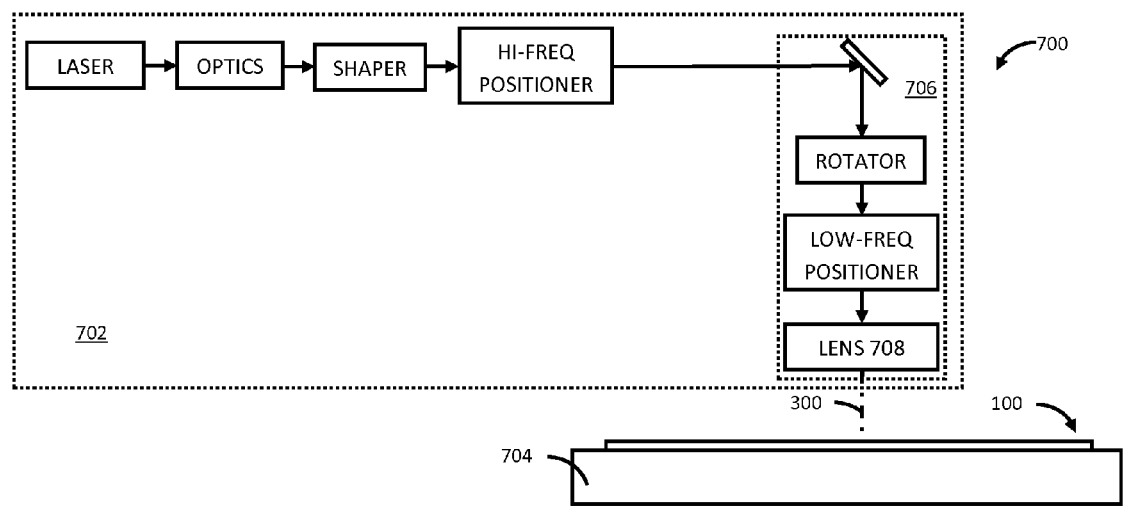
FIG. 7 schematically illustrates a workpiece processing apparatus including a beam source according to one embodiment, which may be operated to form modified regions such as those exemplarily described with respect to FIG. 2.
Figure 8:
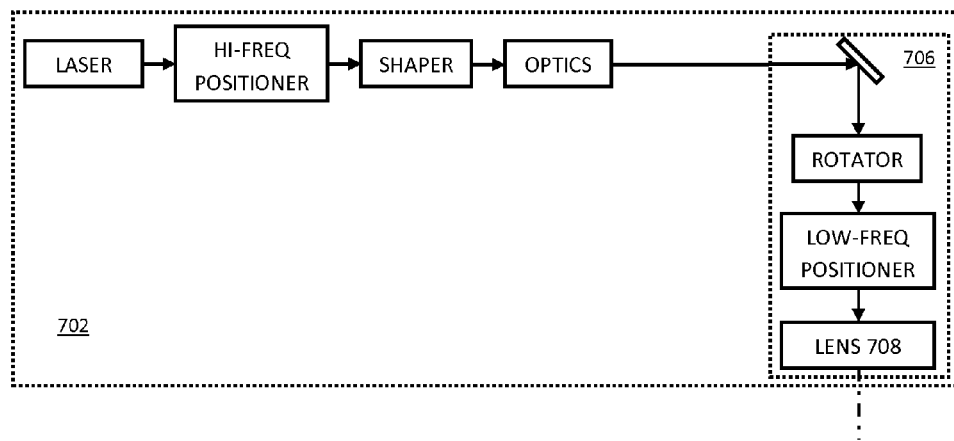
FIGS. 8 to 11 schematically illustrate other embodiments of beam sources that may incorporated into the workpiece processing apparatus shown in FIG. 7.
Figure 9:
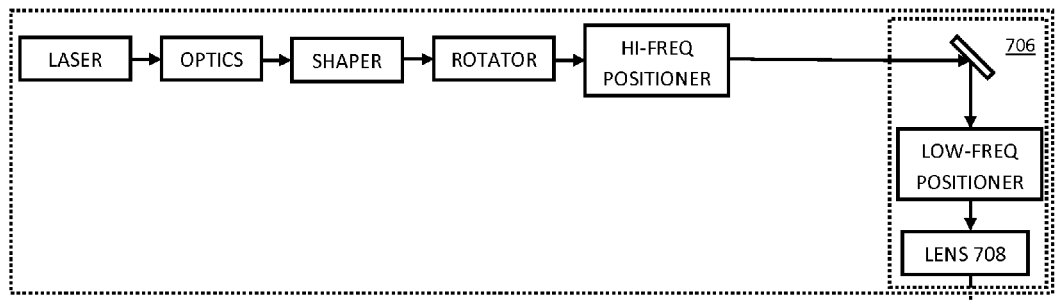
Figure 10:
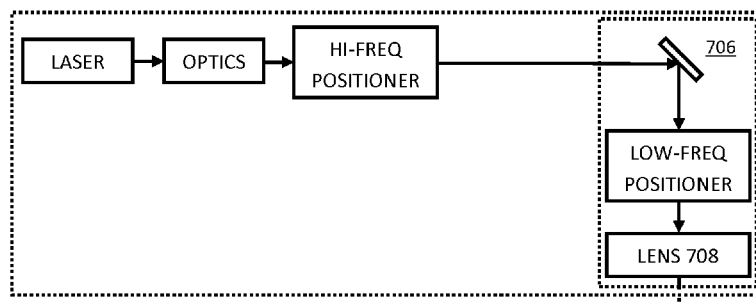
Figure 11:
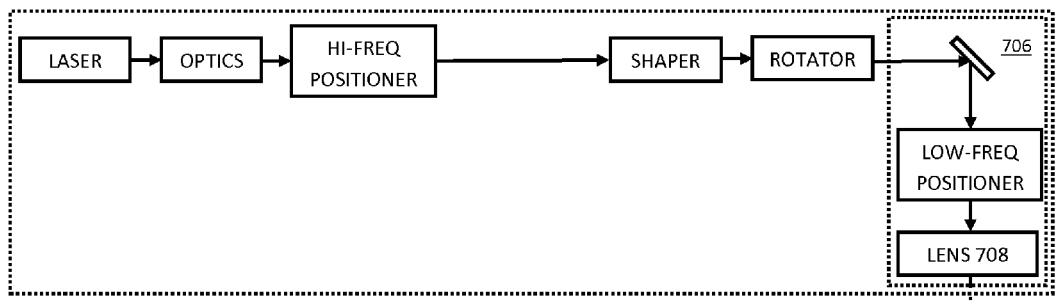

Referring to FIG. 7, a workpiece processing apparatus 700 may include a beam source 702 and configured to generate the aforementioned beam of laser pulses and a support 704.

In the illustrated embodiment, the beam source 702 may include a laser configured to generate pulses of laser light, optics (e.g., configured to expand, collimate, filter, etc.) laser light generated by the laser, a shaper as exemplarily described above, a high-frequency positioner (e.g., an acousto-optic (AO) modulator (AOM), an AO deflector (AOD), an electro-optic (EO) modulator (EOM), an EO deflector (EOD), or the like or a combination thereof), and any other beam dump components or relay components configured to relay a beam of laser pulses to a laser head 706. The laser head 706 may include a mirror, a rotator as exemplarily described above, a low frequency positioner (e.g., one or more galvanometric mirrors) and a scan lens 708. Generally, the high and low frequency positioners may be operated to adjust the orientation of the optical axis 300 relative to the workpiece 100. The laser head 706 may be movable relative to the workpiece 100 to adjust the position of the optical axis 300 (e.g., linearly along the aforementioned x axis, linearly along the aforementioned y axis, or the like or a combination thereof) relative to the workpiece 100.

The support 704 may be configured to support the workpiece 100 and move the workpiece 100 (e.g., linearly along the aforementioned x-axis, linearly along the aforementioned y-axis, rotatably about the aforementioned z-axis, or the like or a combination thereof). The support 704 may include a chuck (e.g., a vacuum chuck, an electrostatic chuck, etc.) configured to support the workpiece 100, or may include a carrier 800 configured to support the workpiece 100, which may be mounted and demounted from a structure such as the chuck.

Although not illustrated, the workpiece processing apparatus 700 may further include a controller coupled to one or both of the beam source 702 and the support 704 to coordinate an operation of thereof and carry out the workpiece modification process exemplarily described above. Notwithstanding the foregoing, it will be appreciated that the beam source 702 may be provided in any other suitable or beneficial configuration, as shown in FIGS. 8 to 11.

Figure 12:
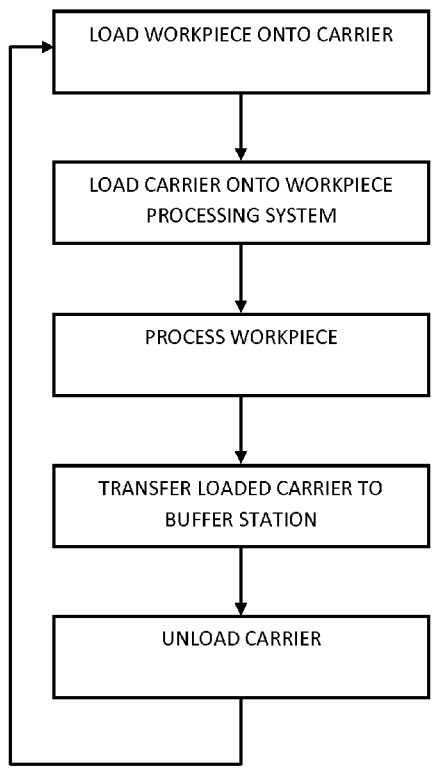
FIG. 12 is a flow chart describing one embodiment of a method for processing a workpiece with a workpiece processing apparatus.

Referring to FIG. 12, loading of a workpiece 100 utilizing carrier 800 involves the steps of loading workpiece 100 onto carrier 800, loading carrier 800 onto workpiece processing system 802, processing workpiece 100 with workpiece processing apparatus 700, transfer workpiece 100 to buffer station 804, unload the processed workpiece 100.

Figure 13A:
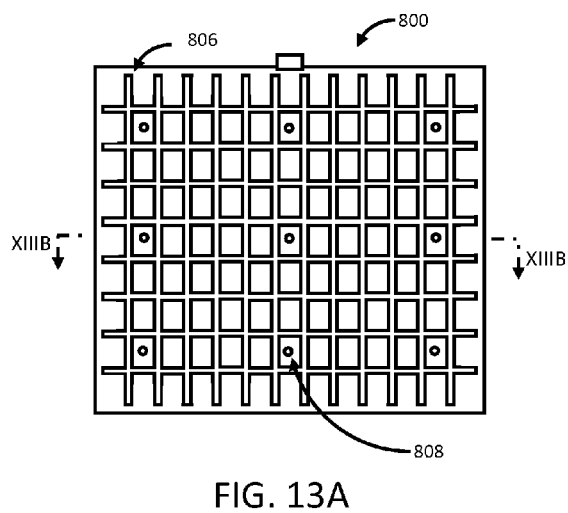
FIG. 13A is a plan view schematically illustrating one embodiment of a workpiece carrier for use with the method exemplarily described with respect to FIG. 12.
Figure 13B:
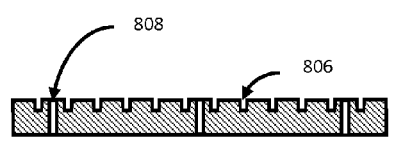
FIG. 13B is a cross-sectional view, taken along line XIIIB-XIIIB shown in FIG. 13A, schematically illustrating one embodiment of the workpiece carrier.

Referring to FIGS. 13A and 13B, carrier 800 is substantially rectangular and comprises fluid channels 806 and vacuum retention channels 808. Fluid channels 806 are located to correspond to separation paths so that BW is located in fluid channels 806 and not in carrier 800. Fluid channels 806 can contain air, nitrogen gas, water, etc. This allows the BW to operate upon workpiece 100 without unnecessarily damaging carrier 800. Vacuum retention channels 808 communicate with vacuum holes in chuck 816 to hold workpiece 100 to carrier 800.

Figure 14A:
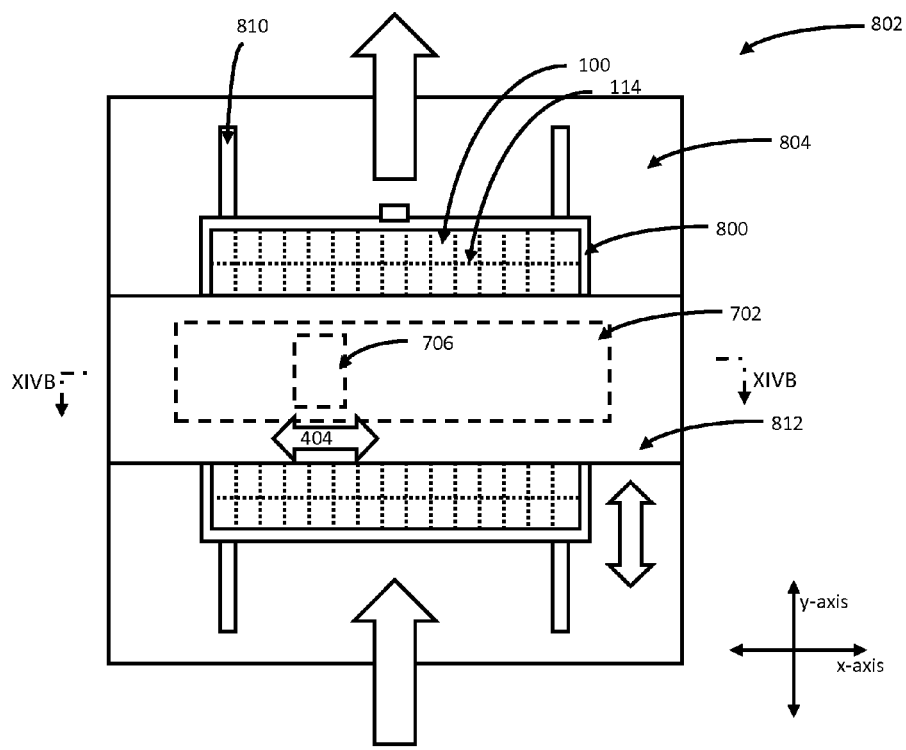
FIG. 14A is a plan view schematically illustrating one embodiment of a workpiece processing apparatus for use with the method exemplarily described with respect to FIG. 12.
Figure 14B:
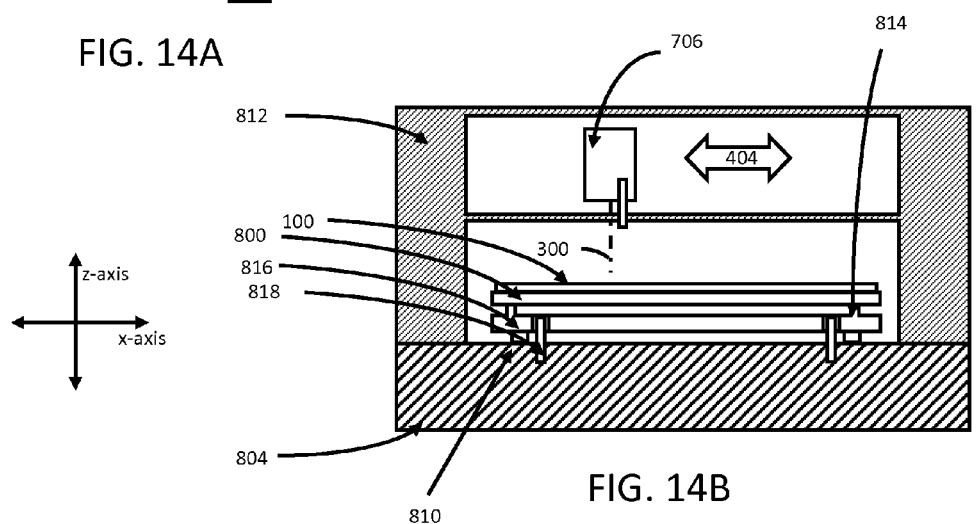
FIG. 14B is a cross-sectional view, taken along line XIVB-XIVB shown in FIG. 14A, schematically illustrating one embodiment of the workpiece processing apparatus.

Referring to FIGS. 14A and 14B, upon base 804 sits support rails 810 which support chuck 816 and lift pins 818 which extend through chuck 816 and raise or lower carrier 800 relative to chuck 816. Chuck 816 sits upon carrier to chuck coupling 814. Carrier 800, in turn, sits upon chuck 816. This arrangement allows movement of chuck 816 and carrier 800 in the y axis and thereby movement of workpiece 100 in the y axis. Around and above chuck 816 and carrier 800 resides gantry 812 which supports laser head 706 for movement in the x axis. Through cooperation of chuck 816 and movement of laser head 706 upon gantry 812, substantially all of workpiece 100 is addressable by optical axis 300.

Figure 15:
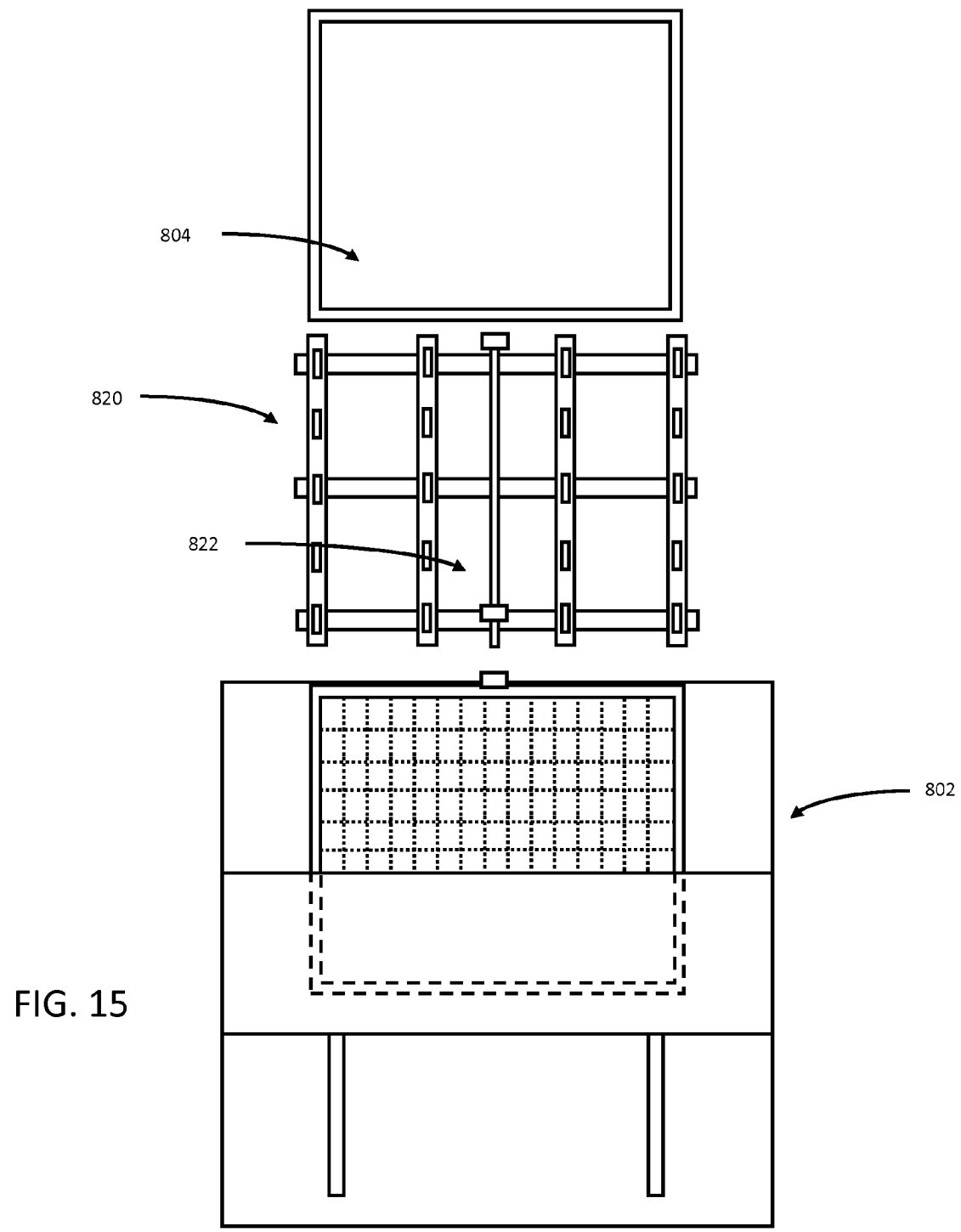
FIG. 15 is a plan view schematically illustrating one embodiment of a transfer system to be used with a workpiece processing apparatus such as that shown in FIGS. 14A and 14B.
Figure 16:
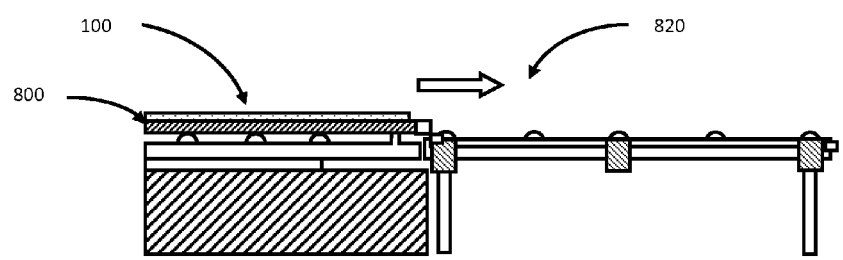
FIG. 16 is an elevation schematically illustrating one embodiment of a method of transferring a workpiece from a workpiece processing apparatus to one embodiment of the transfer system shown in FIG. 15.
Figure 17:
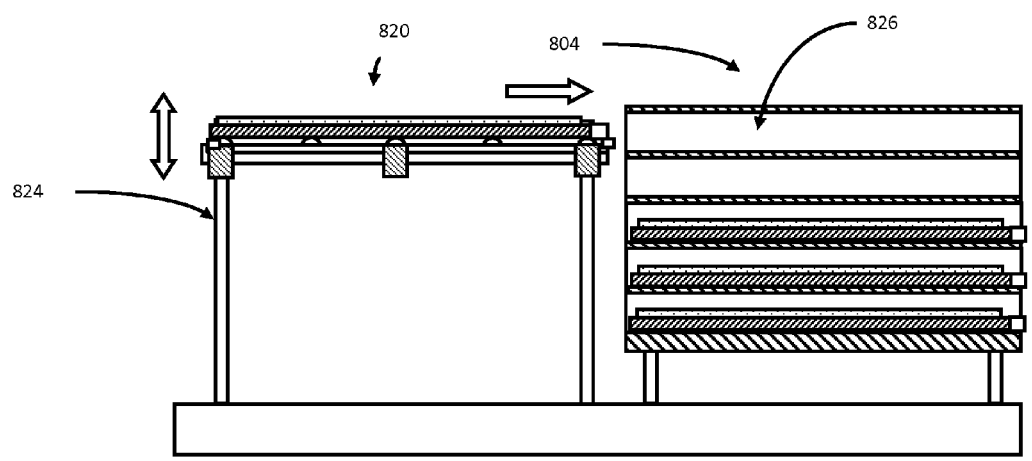
FIG. 17 is an elevation schematically illustrating one embodiment of a method of transferring a workpiece from another embodiment of the transfer system shown in FIG. 15 to a buffer station.

Referring to FIGS. 15 through 17, the loading and off loading of workpiece 100 is described. The following description of movement of carrier 800 includes workpiece 100 residing upon carrier 800. For off loading, carrier 800 is translated to a position upon workpiece processing apparatus 802 most near transfer robot 820. Lift pins 818 then lift carrier 800. Horizontal actuator 822 then contacts and pulls carrier 800 to center it upon transfer robot 820. Horizontal actuator 822 configured to move the carrier 800 having the processed workpiece 100 thereon, off the workpiece processing apparatus 802 and into the buffer station 804 where singulated pieces of the workpiece 100 (separated along the separation path 114/600) can be removed from the carrier 800. Frame 824 then moves carrier 800 vertically to align it with a shelf 826 of buffer station 804. Horizontal actuator 822 then further translates carrier 800 to a slot in buffer station 804. Loading is performed in the reverse.

Figure 18:
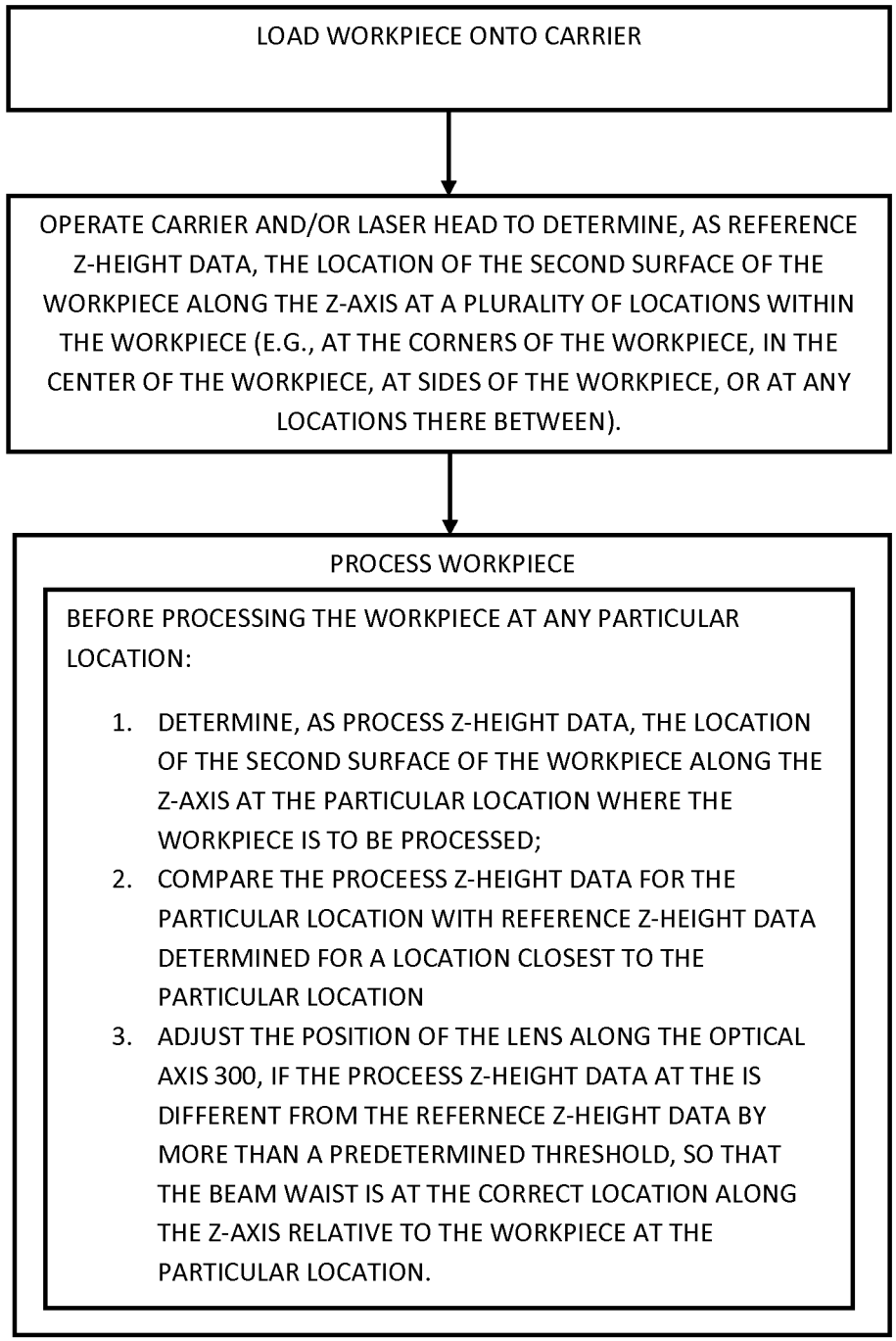
FIG. 18 is a flow chart describing a process for ensuring that the beam waist of the beam is properly located along the z-axis during the workpiece modification process.

Referring to FIG. 18, once workpiece 100 is upon carrier 800 and both are loaded into position upon workpiece processing apparatus 802, there is a preprocessing step to ensure that BW will be properly placed for the specific workpiece 100 being processed. Carrier 800 and laser head 706 are moved to survey the z-height of second surface 104. Then the z-height at the particular location for processing is determined. The z-height data for the particular location is compared with the reference z-height data determined for a location closest to the particular location. Finally, if the processed z-height data at the specific location is different from the reference z-height data by more than a predetermined threshold, the position of lens 708 is adjusted along optical axis 300, so that the beam waist is at the correct location along the z-axis relative to workpiece 100 at the particular location.

The foregoing is illustrative of example embodiments of the invention and is not to be construed as limiting thereof. Although a few example embodiments have been described, those skilled in the art will readily appreciate that many modifications are possible without materially departing from the novel teachings and advantages of the invention. Accordingly, all such modifications are intended to be included within the scope of the invention as defined in the following claims.

What is claimed is:

1. A method, comprising:
providing a workpiece having a first surface, a second surface opposite the first surface and an interior between the first surface and the second surface;
generating a beam of focused laser pulses, the beam of focused laser pulses being characterized by beam waist at which laser pulses within the beam can attain a first fluence; and
forming a plurality of modified regions within the workpiece, each modified region extending from the second surface into the interior of the workpiece, wherein forming each modified region of the plurality of regions includes:
directing the beam of laser pulses onto the workpiece such that laser pulses within the beam pass through the first surface into the interior of the workpiece and towards the second surface, while causing relative motion between the workpiece and the beam of laser pulses, to modify a plurality of portions of the workpiece such that at least one of the plurality of portions of the workpiece is at the second surface of the workpiece and such that at least one modified portion of the workpiece is irradiated with a laser pulse characterized by a fluence less than the first fluence but sufficient to modify an additional portion of the workpiece; and
after irradiating the at least one modified portion of the workpiece with a laser pulse, modifying a characteristic of the beam of laser pulses such that at least one modified portion of the workpiece is not irradiated with a laser pulse characterized by a fluence sufficient to modify a portion of the workpiece.

2. The method of claim 1 further comprising determining a depth within the interior of the workpiece to which a modified region should extend based upon a characteristic of the laser beam.

3. The method of claim 1 wherein the characteristic of the beam comprises a pulse repetition rate.

4. The method of claim 1 wherein the characteristic of the beam comprises a pulse intensity.

5. The method of claim 1 wherein the characteristic of the beam comprises a pulse fluence.

6. The method of claim 1 wherein the characteristic of the beam comprises a spatial pulse spot shape.

7. The method of claim 1 wherein the characteristic of the beam comprises pulse spot size.

8. The method of claim 1 wherein the characteristic of the beam comprises an orientation of an optical axis along which the laser pulses impinge upon the workpiece at the first surface.

9. The method of claim 1 wherein the characteristic of the beam comprises pulse duration.

10. The method of claim 1 wherein the characteristic of the beam comprises temporal pulse shape.

11. The method of claim 1 wherein the characteristic of the beam comprises pulse wavelength.

12. The method of claim 1 wherein at least one laser pulse within the beam impinges the first surface at a spot having a non-circular shape.

13. The method of claim 1, wherein the workpiece includes a strengthened glass workpiece.

14. The method of claim 1, wherein at least one laser pulse within the beam includes light having a wavelength in the green range of the visible spectrum.

15. The method of claim 1, wherein the beam of laser pulses has a Duty cycle greater than 10%.

16. The method of claim 15, wherein the beam of laser pulses has a Duty cycle less than 50%.

17. The method of claim 1, wherein at least one of the modified regions extends from the second surface of the workpiece into the workpiece by a height that is greater than 30% of the thickness of the workpiece.

18. The method of claim 17, wherein at least one of the modified regions extends from the second surface of the workpiece into the workpiece by a height that is less than 60% of the thickness of the workpiece.

19. The method of claim 1, wherein at least one of the laser pulses has a pulse duration greater than 18 ns.

20. The method of claim 1, wherein at least one of the laser pulses has a pulse duration less than 20 ns.

21. The method of claim 1, wherein the modified region includes an inclination angle, and the inclination angle is less than about 30°, as measured from a line.

22. The method of claim 21, wherein the inclination angle is less than about 10°.

23. The method of claim 22, wherein the inclination angle is less than about 1°.

24. The method of claim 1, further comprising determining a depth within the interior of the workpiece to which a modified region should extend based upon a characteristic of the workpiece.

25. The method of claim 1, wherein causing relative motion between the workpiece and the output of the beam source comprises causing relative motion between the workpiece and the output of the beam source such that the beam of laser pulses is translated through the first surface.

26. The method of claim 25, wherein a distance between adjacent modified regions along the path is greater than 100 µm.

27. The method of claim 26, wherein a distance between adjacent modified regions along the path is less than 300 µm.

28. The method of claim 1, wherein modifying the characteristic of the beam of laser pulses comprises modifying the characteristic of the beam of laser pulses such that at least one modified portion of the workpiece is irradiated with a laser pulse characterized by a fluence that is less than the first fluence and that is not sufficient to modify a portion of the workpiece.

29. A method, comprising:
providing the workpiece having a first surface, a second surface opposite the first surface and an interior between the first surface and the second surface;

generating a beam of focused laser pulses, the beam of focused laser pulses being characterized by beam waist at which laser pulses within the beam can attain a first fluence; and forming a plurality of modified regions within the workpiece, each modified region extending from the second surface into the interior of the workpiece, wherein forming each modified region of the plurality of regions includes:

directing a beam of focused laser pulses onto the workpiece such that laser pulses within the beam pass through the first surface into the interior of the workpiece and towards the second surface, while causing relative motion between the workpiece and the beam of laser pulses, to modify a plurality of portions of the workpiece such that at least one of the plurality of portions of the workpiece is at the second surface of the workpiece and such that at least one modified portion of the workpiece is irradiated with a laser pulse characterized by a fluence less than the first fluence but sufficient to modify an additional portion of the workpiece, wherein at least one laser pulse within the beam includes light having a wavelength in the ultraviolet spectrum.

30. A method, comprising:

providing a workpiece having a first surface, a second surface opposite the first surface and an interior between the first surface and the second surface; and forming a plurality of modified regions within the workpiece, each modified region extending from the second surface into the interior of the workpiece, wherein forming each modified region of the plurality of regions includes:

directing the beam of laser pulses onto the workpiece such that laser pulses within the beam pass through the first surface into the interior of the workpiece and towards the second surface, while causing relative motion between the workpiece and the beam, to modify a plurality of portions of the workpiece such that at least one of the plurality of portions of the workpiece is at the second surface of the workpiece, wherein the beam of laser pulses is temporally provided as at least two consecutive bursts of laser pulses, wherein a time period between consecutive pulses within a common burst is less than time period between consecutive bursts such that at least one portion of the workpiece modified by a laser pulse in a particular burst is irradiated with another pulse that is in the particular burst.

31. The method of claim 30, wherein laser pulses within at least one of the bursts of laser pulses are directed onto the workpiece at a pulse repetition rate greater than 90 kHz.

32. The method of claim 31, wherein laser pulses within at least one of the bursts of laser pulses are directed onto the workpiece at a pulse repetition rate less than 120 kHz.

33. The method of claim 30, wherein a period of time between the beginning of one of one burst of laser pulses and the beginning of a consecutively generated burst of laser pulses is greater than 50 vs.

34. The method of claim 33, wherein a period of time between the beginning of one of one burst of laser pulses and the beginning of a consecutively generated burst of laser pulses is less than 500 vs.

35. The method of claim 30, wherein the time period between consecutive pulses within a common burst is less than time period between consecutive bursts such that at least one portion of the workpiece modified by a laser pulse in a particular burst is not irradiated with another pulse that is in a consecutive burst following the particular burst and that is characterized by a fluence sufficient to modify a portion of the workpiece.

36. An apparatus for processing a workpiece having a first surface, a second surface opposite the first surface and an interior between the first surface and the second surface, the apparatus comprising:

a support for supporting and moving the workpiece;

a beam source for generating and positioning a beam of focused laser pulses, the beam of focused laser pulses being characterized by beam waist at which laser pulses within the beam can attain a first fluence; and a controller coupled to at least one selected from the group consisting of the support and the beam source, the controller configured to control an operation of at least one selected from the group consisting of the support and the beam source to form a plurality of modified regions within the workpiece, each modified region extending from the second surface into the interior of the workpiece according to a process, the process including:

directing the beam of laser pulses from an output of the beam source onto the workpiece such that laser pulses within the beam pass through the first surface into the interior of the workpiece and towards the second surface, while causing relative motion between the workpiece and the beam of laser pulses, to modify a plurality of portions of the workpiece such that at least one of the plurality of portions of the workpiece is at the second surface of the workpiece and such that at least one modified portion of the workpiece is irradiated with a laser pulse characterized by a fluence less than the first fluence but sufficient to modify an additional portion of the workpiece; and after irradiating the at least one modified portion of the workpiece with a laser pulse, modifying a characteristic of the beam of laser pulses such that at least one modified portion of the workpiece is not irradiated with a laser pulse characterized by a fluence sufficient to modify a portion of the workpiece.

37. A method for processing a workpiece having a first surface, a second surface opposite the first surface and an interior between the first surface and the second surface, the method comprising:

forming a plurality of modified regions within the workpiece, each modified workpiece region extending from the second surface into the interior of the workpiece to a height that is less than the thickness of the workpiece, wherein forming each modified region includes:

directing, along an optical axis intersecting the workpiece, a focused beam of laser pulses, the focused beam of laser pulses being characterized by beam waist at which laser pulses within the beam can attain a first fluence, such that the laser pulses within the beam pass into the interior of the workpiece through the first surface, wherein the focused beam of laser pulses has a plurality of characteristics and is configured to modify a portion of the workpiece;

while directing the beam of laser pulses onto the workpiece, imparting relative motion between the workpiece and the optical axis to modify a plurality of portions of the workpiece, wherein at least one modified portion of the workpiece is irradiated with a laser pulse characterized by a fluence less than the first fluence but sufficient to modify an additional portion of the workpiece; and while imparting relative motion between the workpiece and the optical axis, modifying at least one of the plurality of characteristics of the focused beam of laser pulses such that at least one modified portion of the workpiece is not irradiated with a laser pulse characterized by a fluence sufficient to modify a portion of the workpiece.

38. The method of claim 37, wherein the directing comprises directing the focused beam of laser pulses such that a beam waist of the focused beam of laser pulses is located closer to the second surface than the first surface.

39. The method of claim 37, wherein at least one modified region includes a portion of the workpiece at the second surface of the workpiece that was modified by the focused beam of laser pulses.

40. A method, comprising:

providing a workpiece having a first surface, a second surface opposite the first surface and an interior between the first surface and the second surface;

generating, within a beam source, a beam of laser pulses; and forming a plurality of modified regions within the workpiece, wherein forming each modified region of the plurality of regions includes:

directing a beam of laser pulses from an output of the beam source along an optical axis onto the workpiece to modify a plurality of portions of the workpiece, wherein laser pulses within the beam pass through the first surface into the interior of the workpiece and towards the second surface;

causing relative motion between the workpiece and the output of the beam source while directing the beam of laser pulses onto the workpiece; and modifying an orientation of the optical axis while causing relative motion between the workpiece and the output of the beam source.

41. The method of claim 40, further comprising modifying the orientation of the optical axis while directing the beam of laser pulses from the output of the beam source along the optical axis onto the workpiece.

42. The method of claim 40, wherein the beam of laser pulses is a focused beam of laser pulses, the focused beam of laser pulses having a beam waist, and wherein the directing comprises directing the focused beam of laser pulses such that the beam waist is located closer to the second surface than the first surface.

* * * * *